US007089358B2

(12) United States Patent
Luse et al.

(10) Patent No.: US 7,089,358 B2
(45) Date of Patent: Aug. 8, 2006

(54) IDENTIFYING AND CONTROLLING DIFFERENT TYPES OF MROMB HARDWARE

(75) Inventors: Paul E Luse, Chandler, AZ (US); Wolfgang Michel, Bad Wimpfen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/032,869

(22) Filed: Jan. 10, 2005

(65) Prior Publication Data
US 2005/0125611 A1 Jun. 9, 2005

Related U.S. Application Data

(62) Division of application No. 10/090,944, filed on Mar. 4, 2002, now Pat. No. 6,922,746.

(51) Int. Cl.
*G06F 9/46* (2006.01)
(52) U.S. Cl. .................. 711/114; 710/300; 710/301
(58) Field of Classification Search .................. 711/4, 711/5, 111, 112, 114, 148, 149, 150, 151, 711/162, 170; 712/33; 710/300, 301, 302, 710/303, 104
See application file for complete search history.

(56) References Cited

U.S. PATENT DOCUMENTS

| 6,260,094 B1 | 7/2001 | Davis et al. | |
| 6,295,565 B1 * | 9/2001 | Lee | 710/301 |
| 6,684,282 B1 * | 1/2004 | Kocis | 710/300 |

OTHER PUBLICATIONS

Poole, Frank W. "A Look at Modular RAID on Motherboard (MROMB)" Intel Corporation, 2002.*
"RAID on Motherboard (ROMB) Considerations Using Intel 80321 I/O Processor" Intel Corporation, Jun. 2002.*
R. Russell, BIOS Basics Online!, Jun. 5, 2001, one page.
A. Tieschenko, "Zero-Channel RAID, The Economic Approach", Computer Review Online!, four pages.
Intel Corporation, "DK440LX Motherboard—Technical Product Specification", Oct. 1997, 106 pages.
Intel Corporation, "MROMB Design Considerations Using the Intel 80303 I/O processor—Application Note" Sep. 2001, 15 pages.
Adaptec—Adaptec SCSI RAID 2000S Support.
Adaptec—Adaptec SCSI RAID 2005S Support.
Adaptec—Motherboard Partners and Compatibility.
Adaptec—Adaptec SCSI RAID 2005S Technical SPecs.
Adaptec—Adaptec Article: Zero Channel RAID Frequently Asked Questions.

(Continued)

*Primary Examiner*—B. James Peikari
(74) *Attorney, Agent, or Firm*—Blakely, Sokoloff, Taylor & Zafman LLP

(57) ABSTRACT

In one embodiment of the present invention, a process that uses a first processor is provided. The process includes the operation of blocking by the first processor of completion by a second processor of a configuration cycle. The process also includes the operation of selecting by the first processor of one procedure from a plurality of procedures that are associated with respective types of circuitry that may be used to permit the first processor to control a device. The one procedure is associated with one of the respective types of circuitry that is actually available to be used by the first processor.

8 Claims, 5 Drawing Sheets

OTHER PUBLICATIONS

Intel Corp., Product Brief, Intel Server Board SCB2.
Serial ATA: High Speed Serialized AT Attachment Revision 1.0, Aug. 29, 2001.
Super0, Super P3TDDR, User's Manual, Revision 1.0a.
PCI Local Bus, PCI BIOS Specification, Revision 2.1, Aug. 26, 1994.
PCI Local Bus, PCT-to-PCI Bridge Architecture Specification, Revision 1.1; Dec. 16, 1998.
PCI Local Bus, PCI Local Bus Specification, Revision 2.2, Dec. 18, 1998.
PCI Local Bus, Mini PCI Specification, Revision 1.0, Oct. 25, 1999.
PCI Local Bus, PCI-X Addendum to the PCI Local Bus Specification, Revision 1.0a, Jul. 24, 2000.
PCI Local Bus, PCI Local Bus Specification, Revision 2.3, Mar. 29, 2002.
PCI Local Bus, Appendix D, Class Codes.
PCI Local Bus, Appendix H, Capability IDs, 0003.13.
Intel Corporation, "DK440LX Motherboard—technical Product Specification", Oct. 1997, 106 pages.
Intel Corporation, "MROMB Design Considerations Using the Intel 80303 I/O Processor—Application Note" Sep. 2001, 15 pages.
A. Tischenko, "Zero-Channel RAID. The Economic Approach", Computer Review Online!, four pages.

* cited by examiner

IDENTIFYING AND CONTROLLING DIFFERENT TYPES OF MROMB HARDWARE

CROSS-REFERENCE TO RELATED APPLICATIONS

The subject application is a divisional of parent U.S. patent application Ser. No. 10/090,944, filed Mar. 4, 2002 now U.S. Pat. No. 6,922,746, entitled "Data Processing System Preventing Configuration Cycles To Permit Control Procedure Selection For Access To Attached Devices."

BACKGROUND

In modular redundant array of independent or inexpensive disk (RAID) on motherboard (MROMB) techniques, MROMB circuitry residing in a circuit card may be used to configure and control, independently of a host processor residing in the motherboard, an input/output (I/O) controller that also resides in the motherboard. The circuit card's circuitry executes a MROMB procedure that uses special MROMB hardware in the motherboard to perform operations that enable the circuitry to configure and control the I/O controller independently of the host processor.

Each respective MROMB technique is implemented using a different respective type of motherboard MROMB hardware. Accordingly, in order to be able to implement a given MROMB technique using a given motherboard's MROMB hardware, a circuit card's MROMB circuitry must be able to execute a MROMB procedure that can use the motherboard's MROMB hardware in such a way as to permit the technique to be implemented properly.

BRIEF DESCRIPTION OF THE DRAWINGS

Features and advantages of embodiments of the present invention will become apparent as the following Detailed Description proceeds, and upon reference to the Drawings, wherein like numerals depict like parts, and in which.

It should be understood that although the following Detailed Description will proceed with reference being made to illustrative embodiments of the present invention, many alternatives, modifications, and variations thereof will be apparent to those skilled in the art. Accordingly, it is intended that the present invention be viewed broadly, and be defined only as set forth in the accompanying claims.

DETAILED DESCRIPTION

Figure 1:
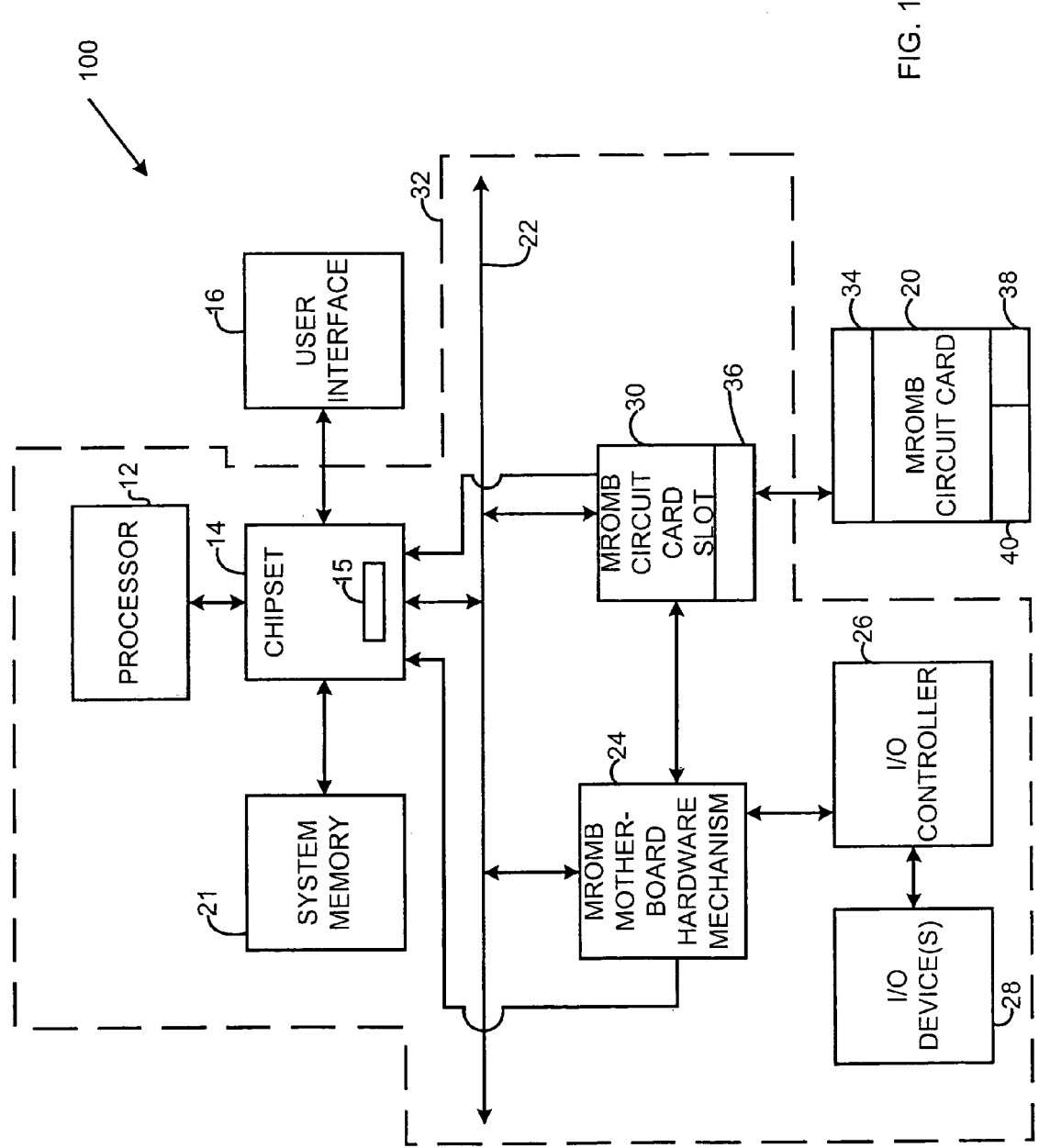
FIG. 1 is diagram that illustrates a system wherein an embodiment of the present invention may be advantageously practiced.
Figure 2:
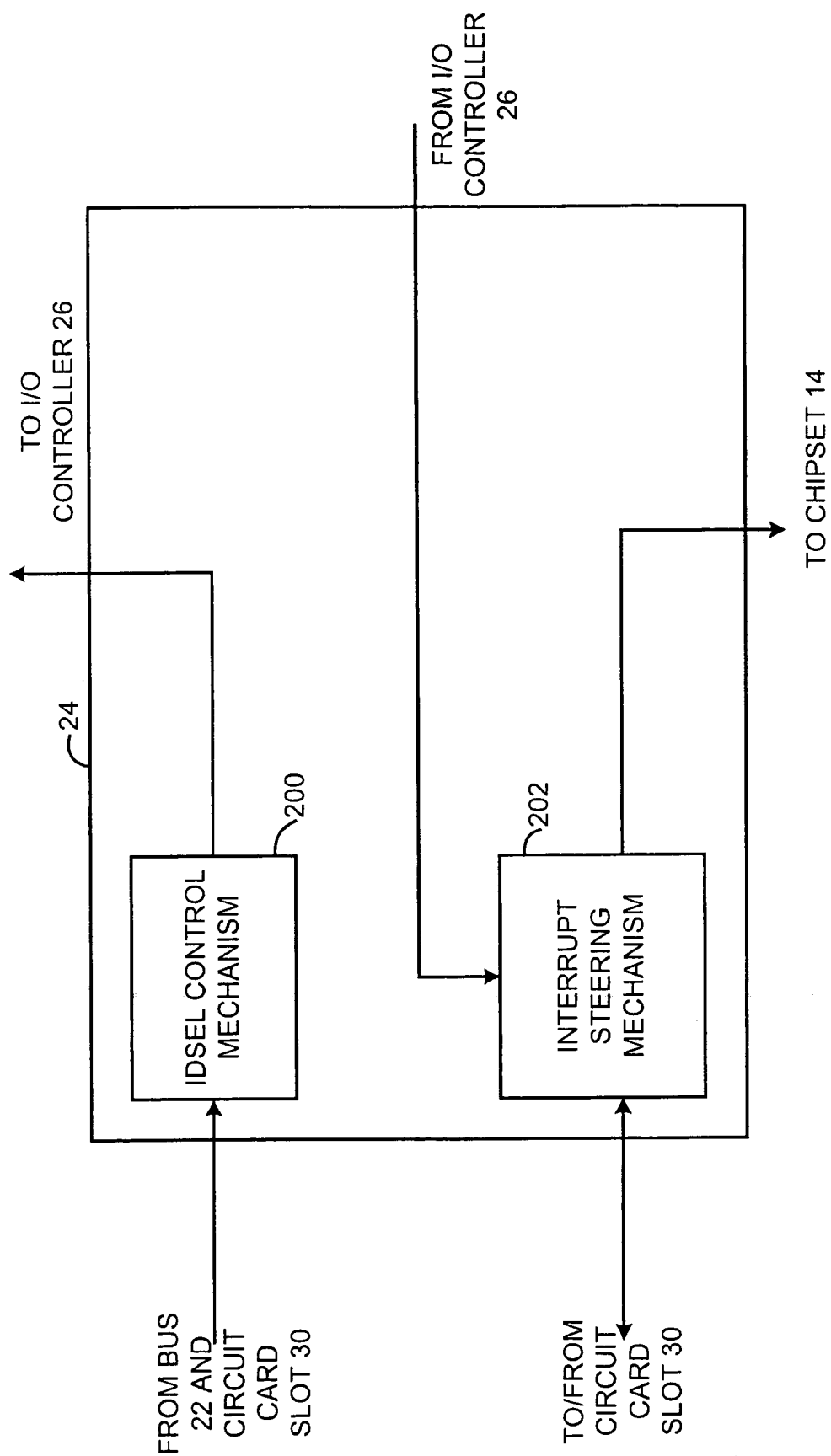
FIG. 2 is a diagram that illustrates one type of MROMB circuitry mechanism that may be used to facilitate control and configuration of an I/O controller by an MROMB circuit card, in accordance with one embodiment of the present invention.

FIG. 1 illustrates a system 10 in which an embodiment of the present invention may be advantageously practiced. System 10 may include a host processor 12 coupled to a chipset 14. The chipset 14 may comprise a host bridge/bus system that may couple the host processor 12, a system memory 21 and a user interface system 16 to each other and to a bus system 22. Chipset 14 may comprise integrated circuit chips included in an integrated circuit chipset commercially available from the owner of the subject application (e.g., the Intel® 860 Chipset). Additionally, chipset 14 may comprise an interrupt controller 15 that may process interrupts that it may receive from components in the system 100, such as, e.g., MROMB circuit card 20, when the card 20 is properly inserted into circuit card bus extension slot 30, and I/O controller 26.

User interface system 16 may comprise, e.g., a keyboard, pointing device, and display system that may permit a human user to input commands to, and monitor the operation of, the system 100.

Bus 22 may comprise a Peripheral Component Interconnect (PCI) bus that complies with the PCI Local Bus Specification, Revision 2.2, Jun. 8, 1998 available from the PCI Special Interest Group, Portland, Oreg., U.S.A. Alternatively, if system 100 is appropriately modified, the bus 22 instead may comprise a PCI-extended (PCI-X) bus that complies with the PCI-X Specification Rev. 1.0a, published by and available from the aforesaid PCI Special Interest Group, Portland, Oreg., U.S.A. It should be appreciated, however, that if system 100 is appropriately modified, bus 22 may comprise other types and configurations of bus systems, without departing from this embodiment of the present invention.

I/O controller 26 may be coupled, via MROMB motherboard hardware 24, to chipset 14, PCI bus 22, and MROMB circuit card slot 30. I/O controller 26 may also be coupled to and control the operation of one or more I/O devices (hereinafter collectively or singly referred to as "I/O device" 28). The I/O device 28 may comprise, for example, a set of one or more storage devices comprising, e.g., one or more magnetic disk, optical disk, or solid-state storage devices. The one or more storage devices may be configured as e.g., one or more arrays of mass storage devices.

Alternatively, the I/O device 28 instead may comprise one or more network adapter or interface devices that may be used to interface the system 100 to an external computer network. According to this alternative arrangement, the I/O device 28 may be configured to exchange data and commands with external network devices (e.g., host or server computer nodes) via the external computer network.

The processor 12, system memory 21, chipset 14, PCI bus 22, MROMB hardware 24, MROMB circuit card slot 30, and I/O controller 26 may be comprised in a single circuit board, e.g., a system motherboard 32. Although the I/O device 28 is shown in FIG. 1 as being comprised in the motherboard 32, the I/O device 28 need not be comprised in the motherboard 32. For example, if the I/O device 28 comprises one or more storage devices, these one or more storage devices may not be comprised in the motherboard 32, but instead, e.g., may be comprised in one or more separate enclosures (i.e., separate from the enclosure in which the motherboard 32 and the components comprised in the motherboard 32 are enclosed) and may be coupled to the I/O controller 26 via one or more network communications links. Additionally, although not shown in the Figures, it should be appreciated that additional devices/components may be present in the system 100 and coupled to the bus 22.

Depending upon the particular configuration and operational characteristics of the I/O device 28, the I/O controller 26 may be configured to exchange data and commands with the I/O device 28 using one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, the I/O controller 26 may be configured to exchange data and commands with the I/O device 28 using other communication protocols, without departing from this embodiment of the present invention.

In accordance with this embodiment of the present invention, the SCSI protocol that may be used by the controller 26 to exchange data and commands with the I/O device 28 may comply or be compatible with the interface/protocol described in American National Standards Institute (ANSI) Small Computer Systems Interface-2 (SCSI-2) ANSI X3.131-1994 Specification. If FC protocol is used by the controller 26 to exchange data and commands with the I/O device 28, it may comply or be compatible with the interface/protocol described in ANSI Standard Fibre Channel (FC) Physical and Signaling Interface-3X3.303:1998 Specification. Alternatively, if Ethernet protocol is used by the controller 26 to exchange data and commands with the I/O device 28, it may comply or be compatible with the protocol described in Institute of Electrical and Electronics Engineers, Inc. (IEEE) Std 802.3, 2000 Edition, published on Oct. 20, 2000. Further, alternatively, if S-ATA protocol is used by the controller 26 to exchange data and commands with the I/O device 28, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by the controller 26 to exchange data and commands with the I/O device 28, it may comply or be compatible with the protocols described in Internet Engineering Task Force (IETF) Request For Comments (RFC) 791 and 793, published September 1981. Also in accordance with this embodiment of the present invention, if the I/O device 28 is used to interface the system 100 to an external computer network, the I/O device 28 may be configured to exchange data and commands with external host and/or server computer nodes via the external computer network using, e.g., the aforesaid TCP/IP and/or Ethernet communication protocols.

Circuit card slot 30 may comprise a PCI expansion slot that comprises a PCI bus connector 36. The connector 36 may be configured to be electrically and mechanically mated with a PCI bus connector 34 that is comprised in MROMB circuit card 20. In addition to comprising the connector 34, the circuit card 20 also may comprise an I/O processor 40 and computer-readable memory 38. Depending upon the particular embodiment, the memory 38 may comprise one or more of the following types of computer-readable memories: semiconductor firmware memory, programmable memory, non-volatile memory, read only memory, electrically programmable memory, random access memory, cache memory, flash memory, and magnetic disk memory, and/or optical disk memory. Although not shown in the Figures, it should be appreciated that the card 20 may include additional circuitry (i.e., in addition to that shown in the Figures) that may facilitate or permit the card 20 to carry out the operations described herein as being carried by the card 20.

The slot 30 and card 20 are configured to permit the card 20 to be inserted into the slot 30. When the card 20 is properly inserted into the slot 30, the connectors 34 and 36 become electrically and mechanically coupled to each other. When the connectors 34 and 36 are so coupled to each other, the card 20 becomes electrically coupled, via the motherboard MROMB circuitry, to the controller 26 and interrupt controller 15, and the card 20 also becomes electrically coupled to the bus 22.

In this embodiment of the present invention, the MROMB hardware 24 in motherboard 32 is configured to permit a single predetermined type of MROMB technique to be implemented in system 100. In this embodiment of the present invention, the predetermined type of MROMB technique that may be implemented in system 100 by using the circuitry 24 depends upon the particular configuration of the circuitry 24. For example, the circuitry 24 may comprise MROMB circuitry of the type used in the Intel® SCB2 Server Board (commercially available from the Assignee of the subject application), which MROMB circuitry may permit a RAID input/output steering (RAIDIOS) type of MROMB technique to be implemented in the system 100. Alternatively, the circuitry 24 may comprise embedded RAID logic (EMRL) MROMB circuitry of the type used in, e.g., the P3TDDR™ motherboard (commercially available from SUPERMICRO Computer Corporation of San Jose, Calif., United States of America), which MROMB circuitry may permit the EMRL type of MROMB technique to be implemented in the system 100. Although the hardware 24 will be described herein as being configured to implement either a RAIDIOS or an EMRL type of MROMB technique, it should be understood that if system 100 is appropriately modified, the hardware 24 instead may be configured to implement other types of MROMB techniques (i.e., different from the RAIDIOS and EMRL types of MROMB techniques), without departing from this embodiment of the present invention.

The particular configuration and operation of the hardware mechanism 24 may vary depending upon whether the hardware 24 is configured to implement a RAIDIOS or non-RAIDIOS type of MROMB technique (e.g., the EMRL MROMB technique). However, in either case, in this embodiment of the present invention, the MROMB hardware 24 may comprise an Initialization Device Select (ID-SEL) control mechanism 200 and an interrupt steering mechanism 202. The IDSEL control mechanism 200 may be coupled to the PCI bus 22, the circuit card slot 30, and the I/O controller 26. The IDSEL control mechanism 200 may include circuitry that is configured to selectively couple an IDSEL signal line of the I/O controller 26 to, or de-couple that line from the PCI bus 22, based upon a control signal provided from the slot 30 to the mechanism 200.

As is well known to those skilled in the art, the IDSEL signal line of the I/O controller 26 may be coupled to a predetermined one of the address lines of the bus 22, and the IDSEL signal that may be supplied to the controller 26 via that line may be used during configuration cycles (i.e., following a reset of the system 100) as a select or enable signal to enable configuration and control of the I/O controller during such configuration cycles. In accordance with this embodiment of the present invention, when the card 20 is absent from the slot 30, this IDSEL signal line may be coupled to the bus 22 by the mechanism 200 in order to allow the host processor 12 to drive that line during host processor-initiated configuration cycles. However, when the card 20 is properly inserted into the slot 30, the IDSEL line of the controller 26 may be disconnected from the bus 22 to "hide" the controller 26 from the host processor 12 during such cycles. Thereafter, the card 20 may cause the IDSEL line of the controller 26 to be coupled to the bus 22 during a configuration cycle initiated by the card 20, in order to permit the controller 26 to be configured and controlled by the card 20, instead of by the host processor 12. It is important to note that although not shown in the Figures (for purposes of not obscuring the features of this embodiment of the present invention), with the exception of the one predetermined address line of the bus 22 that is used to propagate the IDSEL signal to the I/O controller 26, in this embodiment of the present invention, the signal lines of the PCI bus 22 may be directly coupled to the I/O controller 26 in such a way as to permit the I/O controller 26 to exchange data and commands, via the bus 22, with other devices in system 100 that may also be coupled to the bus 22.

Interrupt steering mechanism 202 may be coupled to the circuit card slot 30, the I/O controller 26 and the interrupt controller 15 in the chipset 14. The mechanism 202 may be configured to couple interrupt signals from the I/O controller 26 to the card slot 30. The mechanism 202 also may be configured to selectively couple the interrupt signals to the interrupt controller 15 in the chipset 14 based upon a control signal supplied to the mechanism from the slot 30. This control signal may cause the interrupt signals of the I/O controller 26 to be coupled to the interrupt controller 15 when the card 20 is absent from the slot 30, and may cause the I/O controller's interrupt signals to be de-coupled from the interrupt controller 15 when the card 20 is properly inserted in the slot 30. Thus, when the card 20 is absent from the slot 30, interrupts generated by the I/O controller 26 may be routed ("steered") by the mechanism 202 to the interrupt controller 15 for processing by the interrupt controller 15. However, when the card 20 is present in the slot 30, interrupts generated by the I/O controller 26 may be routed by the mechanism 202 to the card 20 for processing by the processor 40 in the card 20. The slot 30 may be configured to transmit interrupts generated by the card 20, when the card 20 is properly inserted into the slot 30, to the interrupt controller 15 to permit these interrupts to be handled by the interrupt controller 15.

Figure 4:
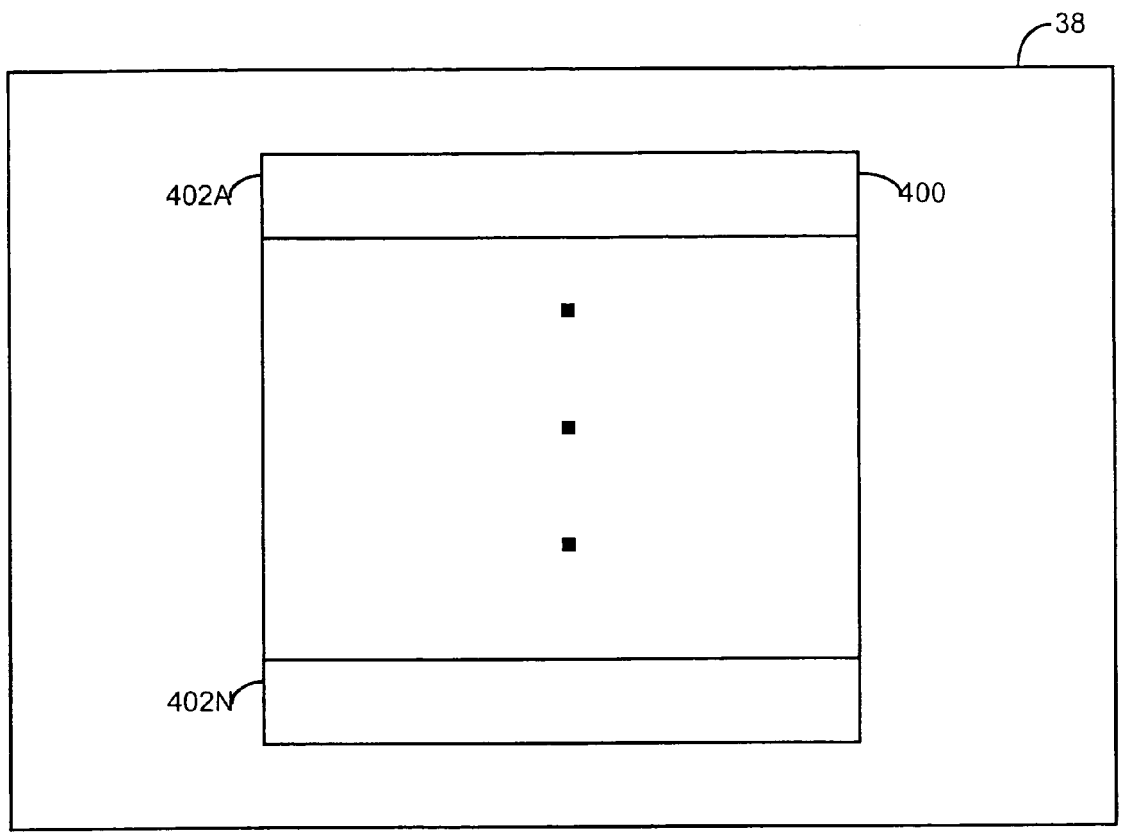
FIG. 4 is a diagram that illustrates procedures that may be stored in memory in a MROMB circuit card according to one embodiment of the present invention.
Figure 5:
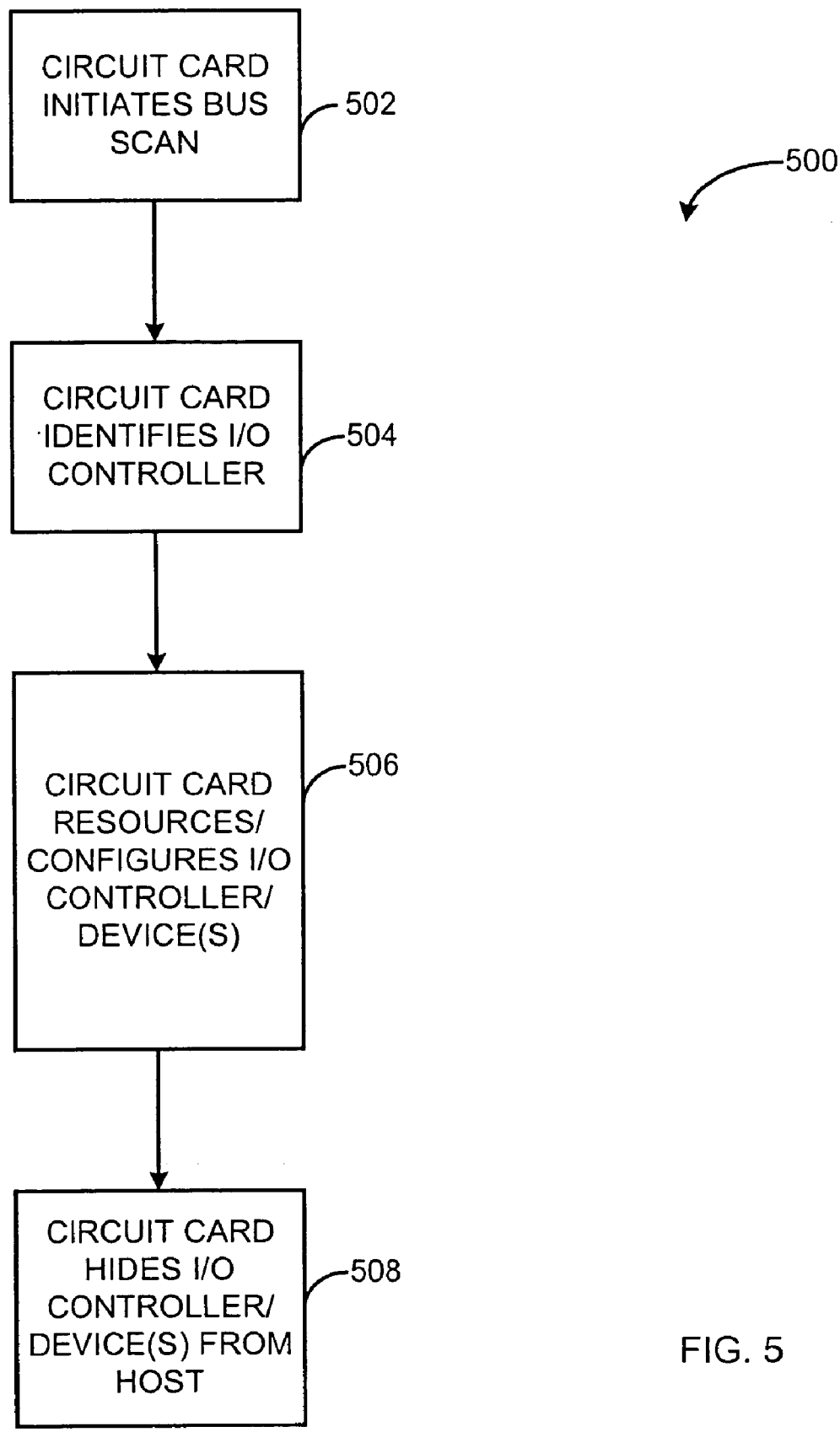
FIG. 5 is a flowchart illustrating operations that may be performed as a result of execution of one of the procedures that may be used to facilitate control and configuration of an I/O controller according to one embodiment of the present invention.

If the hardware 24 is configured to implement the RAIDIOS type of MROMB technique, the IDSEL control mechanism 200 may include a transistor-based switching mechanism that may be caused to be either in a first state, in which the IDSEL signal line of the I/O controller 26 may be coupled to the PCI bus 22, or in a second state, in which that signal line may be disconnected from the PCI bus 22. As is known to those skilled in the art, the IDSEL signal is a synchronous signal with respective to the PCI bus' clock. Therefore, the switching mechanism may be configured to operate with a sub-nanosecond propagation delay. The control signal that controls the state of this switching mechanism may be the Joint Test Action Group (JTAG) IEEE Standard Test Access Port and Boundary-Scan Architecture (i.e., compliant with IEEE Standard 1149.1-1990) Test Mode Select (TMS) signal from the PCI bus slot 30. That is, the TMS signal pin in the PCI slot 30 may be coupled to the control mechanism 200, and the state of the signal (hereinafter termed the "TMS signal" of slot 30) propagating to the control mechanism 200 through this TMS signal pin of the slot 30 may control the state of the switching mechanism in the control mechanism 200. The slot 30 may be configured such that, when the card 20 is absent from (i.e., not properly inserted in) the slot 30, the state of this TMS signal may be driven to a logic state (e.g., a high logic state) that may cause the switching mechanism in the control mechanism 200 to connect the I/O controller's IDSEL signal to the bus 22. However, when the adapter card 20 is properly inserted into the slot 30, the processor 38 in the card 20 may control the logic state of this TMS signal. Thereafter, the processor 40 may control the state of logic state of this TMS signal in accordance with a software procedure (e.g., procedure 402A shown in FIG. 4) stored in memory 38, as will be described below.

Additionally, if the hardware 24 is configured to implement the RAIDIOS type of MROMB technique, the interrupt steering mechanism 202 may include a plurality of tri-state buffers controlled by the logic state of the signal (hereinafter termed the "TDI signal" from slot 30) propagating through the JTAG Test Data Input (TDI) pin of the slot 30. These tri-state buffers may be configured to permit predetermined interrupt signals (e.g., INTA# and INTB#) from the controller 26 to be received by the interrupt controller 15 only when the signal propagating through the TDI pin of the slot 30 is of a predetermined logic level (e.g., a high logic state). The slot 30 may be configured such that, when the card 20 is absent from the slot 30, the signal propagating through the TDI pin of the slot 30 may be driven to a high logic state, and conversely, when the card 20 is properly inserted in the slot 30, this signal may be driven to a low logic state and the interrupt signals from the I/O controller 26 may be routed to predetermined interrupt signal pins (e.g., INTC# and INTD# signal pins) of the slot 30. Interrupt signal pin INTA# of the slot 30 may be coupled to the interrupt controller 15.

As stated previously, the configuration of the hardware 24 may vary depending upon the particular MROMB technique that may be implemented using the hardware 24. Thus, if the hardware 24 is configured to implement a non-RAIDIOS MROMB technique (e.g., one that does not use the TMS and TDI signals in the manner that they are used in the RAIDIOS technique), the configuration and operation of the IDSEL control mechanism 200, the interrupt steering mechanism 202, and the control signals provided to the hardware 24 from the slot 30 may differ from the RAIDIOS technique.

Accordingly, in this embodiment of the present invention, card 20 includes firmware program instructions 400 stored in the memory 38 (see FIG. 4) that permit the card 20 to control and configure the I/O controller 26 using either the RAIDIOS or another (i.e., non-RAIDIOS) type of MROMB technique. That is, the program instructions 400 permit the card 20 to control and configure the I/O controller 26 using the hardware 24, regardless of whether the hardware 24 is configured to implement the RAIDIOS or another non-RAIDIOS type of MROMB technique. When executed by the processor 40, procedures or subroutines in the instructions 400 may cause the processor 40 to cause operations to be executed in system 100 that may permit the processor 40 to determine whether the hardware 24 is configured to implement either the RAIDIOS or a non-RAIDIOS type of MROMB technique. The processor 40 then may use the hardware 24 to control and configure the I/O controller 26 in accordance with the particular MROMB technique that the hardware 24 is configured to implement.

Figure 3:
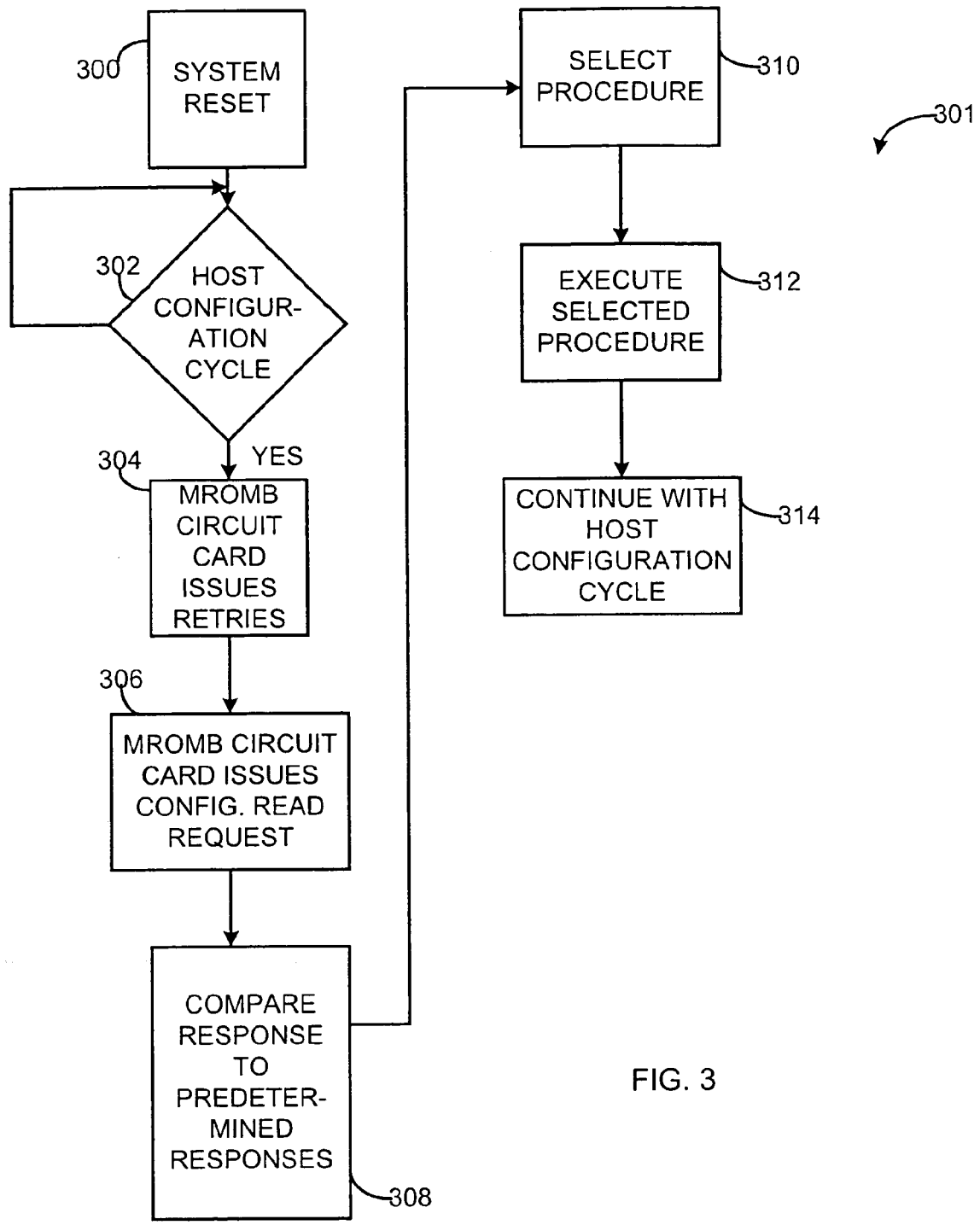
FIG. 3 is a flowchart illustrating operations involved in practicing one embodiment of the present invention.

FIG. 3 is a flowchart that illustrates these and other operations 301 that may be carried out in system 100, in accordance with one embodiment of the present invention. After a reset of system 100 (see operation 300), the I/O processor 40 in card 20 may execute one or more subroutines or procedures comprised in program instructions 400 (see FIG. 4) that may cause the I/O processor 40 to analyze the signals propagating through the bus 22 to determine whether the host processor 12 has initiated a host configuration cycle of the system 100 (see operation 302). After the I/O processor 40 has determined that the host processor 12 has initiated such a configuration cycle, the I/O processor 40 may cause the card 20 to issue retries to the host processor 12 to hold-off (i.e., block or prevent the completion or implementation of) the configuration cycle initiated by the host processor 12 (see operation 304). Thereafter, while the configuration cycle initiated by the host processor 12 is being held-off, the I/O processor 40 may cause the card 20 to initiate and execute its own configuration cycle, in which the card 20 may first cause the mechanism 200 to re-couple the I/O controller's IDSEL line to the bus 22 (as this line initially was de-coupled from the bus 22 when the card 20 was inserted in the slot 30). The card 20 may then begin its own configuration cycle bus scan that includes issuing, via the bus 22, configuration read requests to addresses addressable via the bus 22. These addresses may include a predetermined address (see operation 304) that may be reserved or pre-assigned, and may be associated with a particular MROMB technique. For example, if the hardware 24 is configured to implement a particular non-RAIDIOS MROMB technique, a particular bus address of the controller 26 may be pre-assigned in accordance with the technique such that the I/O controller 26 will respond to a configuration read request addressed to that bus address. Depending upon the particular non-RAIDIOS technique implemented by the hardware 24, the particular assertion states of the address lines in the bus 22 that may correspond to the predetermined address may vary. However, in one possible implementation of a non-RAIDIOS technique in system 100, when the I/O processor 40 addresses the I/O controller 26 via the bus 22 during a configuration cycle initiated by the I/O processor 40, all of the address lines in the bus 22 may be unasserted.

After issuing the configuration read request to the predetermined address, the processor 40 may receive and analyze the response (hereinafter termed "the received response") that it receives via the bus 22 to this request. As is described more fully below, the analysis by the processor 40 of the received response may include comparison of the received response to one or more predetermined responses (see operation 308). Based at least in part upon this comparison, the processor 40 may determine whether the hardware 24 is configured to implement the RAIDIOS or some other MROMB technique. Thereafter, based upon the determination by the processor 40 of the type of MROMB technique that the hardware 24 is configured to implement, the processor 40 may select a control procedure from the instructions 400 that, when executed by the processor 40, may cause the processor 40 to properly control the hardware 24 (see operation 310). The processor 40 then may execute the selected control procedure (see operation 312), and may control the hardware 24 in accordance therewith. This may permit the processor 40 to appropriately control and configure the I/O controller 26 using the hardware 24. Thereafter, processor 40 may stop issuing retries in response to the host processor-initiated configuration cycle, and the system 100 may continue its normal reset configuration process (see operation 314).

More specifically, when the processor 40 receives the received response, the processor 40 initially may compare it to a first predetermined response. The first predetermined response may comprise a data word FFFFFFFF hexadecimal, and result in a master abort condition. If the received response matches the first predetermined response, this indicates that no device is present in system 100 at the predetermined address, and therefore, the hardware 24 is not configured to implement a non-RAIDIOS MROMB technique. Therefore, if the received response matches the first predetermined response, the processor 40 determines that the hardware 24 is configured to implement the RAIDIOS MROMB technique, and selects from instructions 400 a control procedure (e.g., procedure 402A) that, when executed by the processor 40, causes the processor 40 to control the RAIDIOS circuitry in hardware 24 in such a way as to permit the I/O controller 26 to be properly configured and controlled by the processor 40 using that RAIDIOS circuitry.

Conversely, if the received response does not match the first predetermined response, this means that a device is present in system 100 at the predetermined address. This may mean that the hardware 24 is configured to implement the particular non-RAIDIOS MROMB technique associated with that address. The processor 40 then may parse/analyze the first data word in the received response (hereinafter termed "the first data word") to determine therefrom vendor and device identification information associated with the I/O controller 26. That is, if the I/O controller 26 is at the predetermined address, the I/O controller 26 may be configured such that the first data word may contain vendor and device identification information (e.g., vendor and device identification numbers) that may identify the I/O controller's vendor and device type. The processor 40 may compare the vendor and device identification information contained in the first data word to vendor and device identification information of I/O controllers that are known to be used in motherboards that comprise various MROMB motherboard hardware (hereinafter termed "supported MROMB motherboards") that implement the particular non-RAIDIOS MROMB technique associated with the predetermined address. If the processor 40 determines that the vendor and device identification information in the first data word matches the vendor and device identification information of I/O controllers that are known to be used in supported MROMB motherboards, the processor 40 determines that the hardware 24 is configured to implement the particular non-RAIDIOS MROMB technique associated with the predetermined address, and selects from instructions 400 a control procedure (e.g., procedure 402N) that, when executed by the processor 40, causes the processor 40 to control the MROMB circuitry in hardware 24 in such a way as to permit the I/O controller 26 to be properly configured and controlled by the processor 40 using that MROMB circuitry.

Conversely, if the processor 40 determines that the vendor and device identification information in the first data word does not match the vendor and device identification of I/O controllers that are known to be used in supported MROMB motherboards, the processor 40 may assume that the hardware 24 is configured to implement the RAIDIOS MROMB technique. The processor 40 then may select from instructions 400 the control procedure 402A, and may attempt to control and configure the controller 26 using the RAIDIOS technique.

As stated previously, depending upon whether the hardware 24 is configured to implement a non-RAIDIOS MROMB technique or the RAIDIOS MROMB technique, the configuration and operation of the IDSEL control mechanism 200, the interrupt steering mechanism 202, and the control signals provided to the hardware 24 from the slot 30 may differ. Thus, depending upon which the two procedures 402A or 402N is selected and executed by the processor 40, the particular operations carried out, and control signals utilized by the processor 40 may vary. For purposes of illustration, operations 500 that may be carried out by the processor 40 when the procedure 402A is executed are described below. It should be appreciated, however, that if the processor 40 executes the procedure 402N, the operations that may be carried out by the processor 40 may differ from those carried out by the processor 40 when the processor 40 executes procedure 402A, so as to permit the processor 40 to appropriately use non-RAIDIOS motherboard MROMB hardware instead of RAIDIOS motherboard hardware technique.

Execution by the processor 40 of the procedure 402A initially causes the processor 40 to cause the circuit card 20 to initiate configuration bus scans (see operation 502) that involves carrying out configuration cycles to identify and configure the controller 26. More specifically, the processor 40 initially may complete a bus scan with the TMS signal toggled to a low logic state (i.e., so as to de-couple the I/O controller's IDSEL from the bus 22), and thereafter, the processor 40 may compare the results of that bus scan with the results of a subsequent bus scan completed with the TMS signal toggled to a high logic state (i.e., so as to couple the I/O controller's IDSEL line to the bus 22). By comparing the results of these two bus scans, the processor 40 may discover the particular address of the I/O controller 26. Thereafter, the processor 40 may obtain configuration information from the I/O controller 26 that may identify the I/O controller's particular device type and characteristics (see operation 504). Based upon this information, the processor 40 then may cause the card 20 to supply and cause to be stored in the controller 26 and memory 21 appropriate control and configuration-related information to properly resource controller 26 and to permit the controller 26 to operate in accordance with enhanced 110 procedures (i.e., enhanced compared to firmware/software procedures originally or previously present in the controller 26) comprised in the instructions 400 (see operation 506). For example, if the I/O device 28 comprises an array of disk mass storage devices, these enhanced I/O procedures may permit the I/O controller 26 and array to be configured and used as a storage controller and RAID array, respectively. Alternatively, the enhanced I/O procedures may permit such a RAID array to operate in accordance with RAID procedures or levels that were not originally or previously programmed into the I/O controller 26. Further alternatively, if the I/O device 28 is used to interface the system 100 to an external computer network, the enhanced I/O procedures may permit the I/O controller 26 to be configured and used as a server management controller, and/or may permit the controller 26 and device 28 to utilize communication protocols that are different from those that were previously possible given the I/O controller's original or previous programming.

Thereafter, the processor 40 may cause the card 20 to toggle to a low logic state the TMS signal. This hides the I/O device 26 from the host processor 12. This may conclude the operations 500 carried out the processor 40 when the processor 40 executes the procedure 402A.

After the host processor 12 has completed its configuration cycles in system 100, the I/O processor 40 may receive and process interrupts received from the I/O controller 26 in accordance with the instructions 400. The I/O processor 40 may generate and supply to the I/O controller 26 commands and data, in response to these interrupts and in accordance with the instructions 400.

Thus, in summary, in one embodiment of the present invention, an adapter card is provided that includes a connector that may be used to couple the card to a bus in a motherboard. When the card is coupled to the bus, circuitry in the card is also coupled to the bus. The circuitry may include an I/O processor and associated firmware memory. The firmware memory may contain instructions that, when executed by the I/O processor, may cause the I/O processor to perform a number of operations. These operations may include causing the card to hold-off a configuration cycle initiated by the motherboard's host processor. This configuration cycle may involve an I/O controller device that is also coupled to the bus. The host processor and the device may be external to the circuit card. The motherboard may include one of a plurality of different types of MROMB hardware. The firmware memory may include a plurality of different MROMB control procedures that are associated with, and when executed, may cause the I/O processor to control properly the different types MROMB hardware. The I/O processor may determine the type of MROMB hardware that is actually present in the motherboard, and may select and execute the one control procedure among the plurality of different control procedures in the firmware memory that, when executed by the processor 40, may permit the I/O processor to control properly the MROMB hardware that is actually present in the motherboard. The execution of the selected procedure may cause the motherboard's MROMB hardware to be used in such a way as to permit the I/O processor to configure and control the I/O controller device independently of the host processor.

Thus, in this embodiment of the present invention, a single circuit card may be used to control different types of MROMB motherboard hardware, such as EMRL and RAIDIOS motherboard hardware. Thus, advantageously, this embodiment of the present invention provides a low cost standardized way to implement advanced/upgraded I/O features and capabilities, such as RAID, on a system that already has an on-board I/O controller, while also exhibiting improved compatibility with different types of MROMB motherboard hardware and techniques.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

For example, although card 20 has been described as issuing a configuration read request to a single predetermined address associated with one particular non-RAIDIOS MROMB technique, if card 20 is appropriately modified, the card 20 may issue a plurality of configuration requests to a plurality of different predetermined addresses that are associated with a plurality of respective non-RAIDIOS MROMB techniques. The processor 40 may compare the responses that it may receive to these configuration read requests to predetermined responses indicative of the particular type of MROMB technique that may be implemented by the hardware 24. The processor 40 may determine, based upon this comparison, the particular type of MROMB technique that may be implemented using the hardware 24, and may select from among procedures 402A . . . 402N an appropriate procedure to execute to permit the processor 40 to configure and control the I/O controller 26 using the hardware 24.

Other modifications are also possible. Accordingly, the claims are intended to cover all such equivalents.

What is claimed is:

1. A system comprising:
 a circuit board comprising a bus and modular redundant array of inexpensive disks on motherboard (MROMB) hardware;

a device coupled to the bus through the MROMB hardware; and circuitry, coupled to the bus, to identify a type of the hardware by causing a request to be issued to the device, and analyzing a response from the device wherein the response comprises a data word, the circuitry to compare the data word to a plurality of predetermined data words corresponding to a plurality of different types of MROMB hardware and, based upon the type of the hardware, to control the hardware to implement a MROMB procedure using the hardware.

2. The system of claim 1, wherein:

the circuit board comprises a host processor;

the device comprises one of a data storage controller, a network data communication controller, and a server management controller;

the circuitry comprises an input/output (I/O) processor and a memory; and the memory is to store a set of program instructions that when executed by the I/O processor, cause the circuitry to identify the type of the hardware, and control the hardware to implement the MROMB procedure.

3. The system of claim 1 wherein the circuitry is to identify the type of the hardware as being one of a plurality of different types for all of which the circuitry can control the hardware to implement a respective one of a plurality of different procedures to configure the device.

4. The system of claim 3 wherein the device comprises a data storage controller to control a set of one or more storage devices.

5. The system of claim 1 further comprising a circuit card, the circuit card comprising a connector and said circuitry, the connector is coupled to a slot in the circuit board, said circuitry being coupled to the bus via the connector.

6. The system of claim 5 wherein the device comprises a data storage controller to control a set of one or more storage devices.

7. The system of claim 1 wherein the predetermined data words comprise respective identification numbers associated with the types of MROMB hardware.

8. The system of claim 1 wherein the data word issued in response to the request identifies the device and a vendor of the device.

* * * * *